B. F. WATERMAN.
GEAR CUTTING MACHINE.
APPLICATION FILED MAR. 30, 1918.

1,364,597.

Patented Jan. 4, 1921.
2 SHEETS—SHEET 1.

Inventor:
Benjamin F. Waterman,
By James H. Thurston
Attorney:

B. F. WATERMAN.
GEAR CUTTING MACHINE.
APPLICATION FILED MAR. 30, 1918.

1,364,597.

Patented Jan. 4, 1921.
2 SHEETS—SHEET 2.

Inventor:
Benjamin F. Waterman,
By James H. Thurston
Attorney.

UNITED STATES PATENT OFFICE.

BENJAMIN F. WATERMAN, OF PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

GEAR-CUTTING MACHINE.

1,364,597.   Specification of Letters Patent.   Patented Jan. 4, 1921.

Application filed March 30, 1918.   Serial No. 225,720.

*To all whom it may concern:*

Be it known that I, BENJAMIN F. WATERMAN, of the city and county of Providence and State of Rhode Island, have invented certain new and useful Improvements in Gear-Cutting Machines; and I do hereby declare the following specification, taken in connection with the accompanying drawings, forming a part of the same, to be a full, clear, and exact description of the invention, such as will enable others skilled in the art to which it appertains to make and use the same.

The invention relates to gear cutting or hobbing machines for cutting spur and spiral or helical gears, and more particularly to machines of this character which make use of a system of differential gears comprising a spider for producing the desired ratio of speed between the index mechanism and the cutter or hob driving mechanism.

The principal object of the present invention consists in locating the differential in the index train instead of in the cutter train, as heretofore commonly done, and in making the spider the driver instead of the driven member as heretofore.

A further object of the invention consists in the employment of novel means for locking the differential so as to produce a direct drive when it is desired to cut spur gears instead of spiral gears.

A further object of the invention is to decrease the strain on the index gears by increasing the speed imparted through the differential.

A further object of the invention is to reduce the extreme ratios of gears in the index gear train so as to eliminate the necessity of using and storing such large gears as heretofore required.

With these objects in view, the invention consists in the novel features of construction and combinations and arrangements of parts as herein set forth and more particularly pointed out in the claims.

In the drawings, Figure 1 is a top plan view, partly in section of a machine embodying my improvements.

Figure 3:
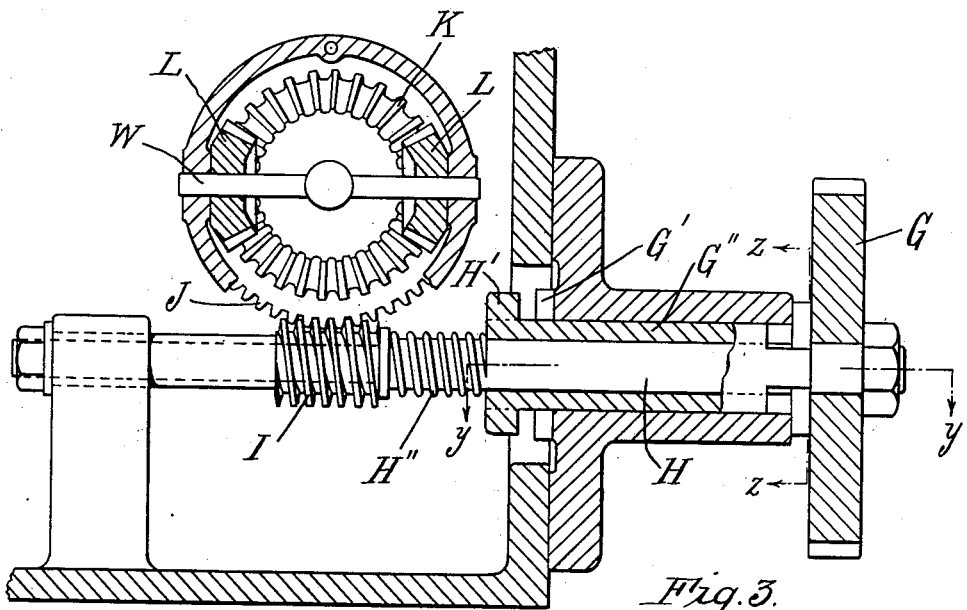
Fig. 3 is a sectional view on line $x$—$x$, Fig. 1.
Figure 4:
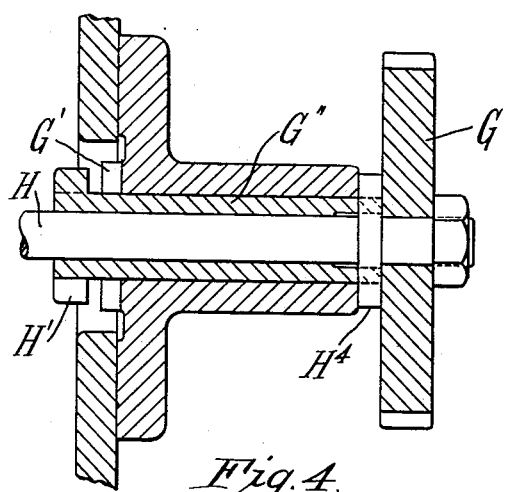
Fig. 4 is a sectional view on line $y$—$y$ Fig. 3.

In the machine shown in the drawings, A represents the main driving pulley which is secured upon the main driving shaft B, which is connected by bevel gears C with a cutter driving shaft D, arranged at right angles to said main shaft B. Said shaft D is connected through a system of gears $a$, $b$, $c$, $d$, $e$ and $f$ to the cutter or hob spindle $g$ upon which is mounted the cutter $h$. Secured upon the end of the shaft D is a spider W upon which are loosely mounted the differential pinions L, which are arranged to engage two differential gears M and K. The said differential gear M is secured to one end of the shaft N, which drives the index gears O, and the other differential gear K is secured to, or formed upon, the face of a worm-wheel J, which is driven by worm I as shown in Fig. 3. It will be understood that the worm I is only driven when the table or cutter slide A' is moved forward or back so as to permit the cutter to engage and disengage the gear blank.

Figure 5:
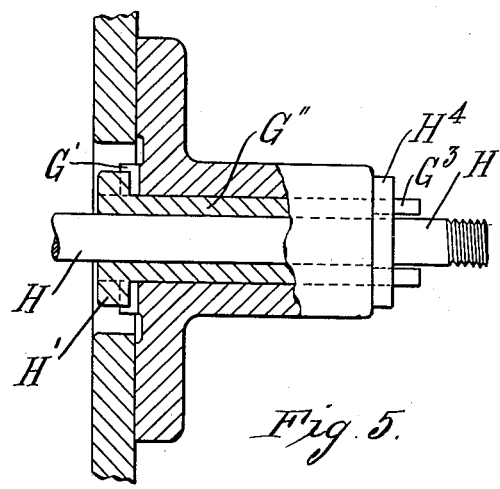
Fig. 5 is a similar view showing the change gear removed and the clutch members engaged.
Figure 6:
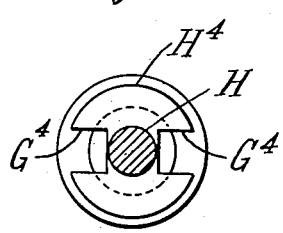
Fig. 6 is a detail view on line $z$—$z$, Fig. 3.

The mechanism for thus driving the worm I comprises the screw B' which moves the table A' and is provided upon one end with the gear C' which meshes with the gear D' secured to one end of the shaft E. Secured upon the other end of the shaft E is a gear F which drives either directly or through a set of intermediate gears (not shown) the gear G secured upon the differential worm shaft H, upon which the worm I is keyed. Mounted upon the differential worm shaft H is a sleeve G'' which has formed upon its inner end a movable clutch member H' which is arranged to engage and disengage a fixed clutch member G' formed upon the bearing which supports one end of the differential worm shaft H, as shown in Fig. 3. The clutch members G' and H' are held out of engagement by the change gear G, which engages the outer end of the sleeve G''. Said outer end of the sleeve G'' is provided with projections $G^3$ arranged to engage corresponding grooves $G^4$ formed in the periphery of the flange $H^4$ formed integral with the worm-shaft H, as shown in Figs. 5 and 6.

Mounted upon the differential worm-shaft H is a spring H'' one end of which is arranged to bear against the worm I and the other end against the movable clutch member H'.

Figure 1:
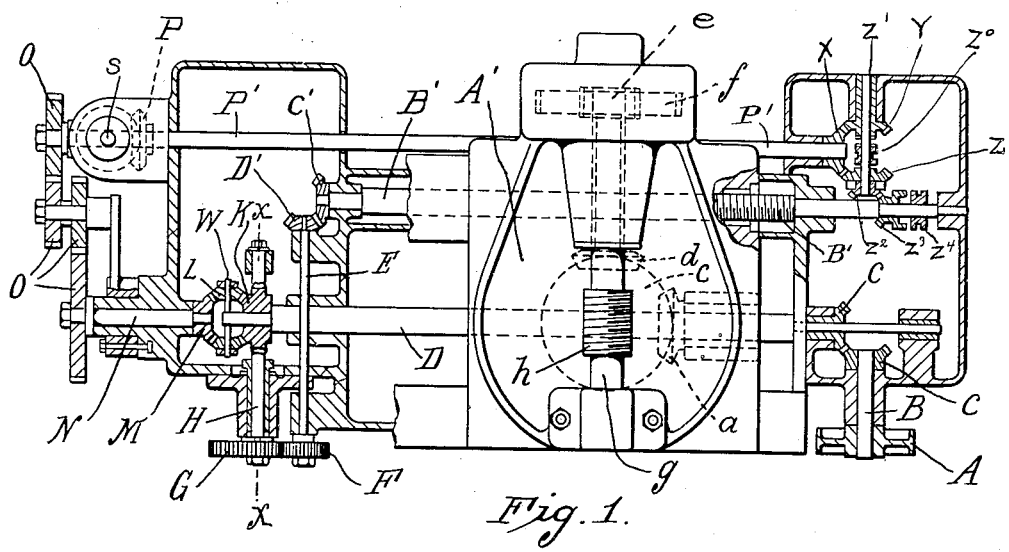
Figure 2:
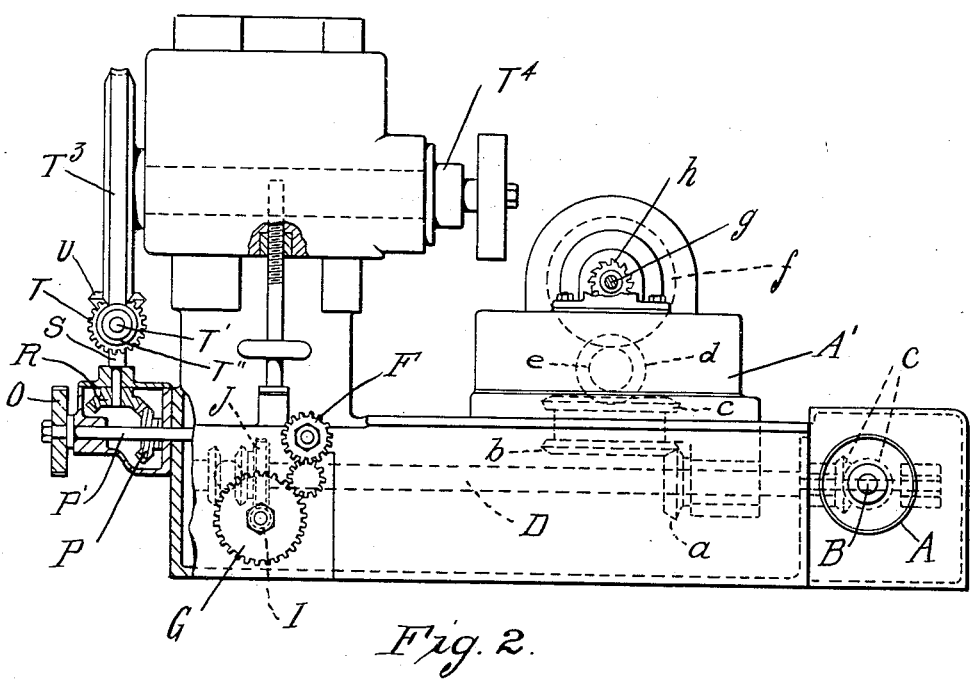
Fig. 2 is a front elevation view.

The connections between the index gears O and the work spindle comprise a shaft P' one end of which is secured to the last index gear O and upon which is secured the miter gear P which drives the gear R secured to the shaft S, as shown in Fig. 2. A gear U is mounted to slide upon the shaft S, but rotates fixedly with it and is arranged to drive the gear T which is fastened to the shaft T' upon which is mounted the index worm T'' which engages and drives the index worm-wheel T³ and the work spindle T⁴.

When it is desired to cut spur gears upon my improved machine the gear G is removed from the differential worm-shaft which permits the movable clutch member H' to be moved outwardly, or to the right in Fig. 3, by the spring H'' and into engagement with the fixed clutch member G'. This causes the worm I to be rigidly held so that no movement can occur between the worm I and worm-wheel J. The locking of said worm I and worm-wheel J likewise locks the differential gear K against movement, by reason of the fact that said worm-wheel J is secured to said differential gear K. With the differential gear thus locked, and the spider W rotated by the driving shaft D, the differential pinions L will rotate about the differential gear K and also about their own axis upon the spider W. It will thus be seen that the differential gear M will be caused to rotate twice as fast as the shaft D.

On the end of shaft P' opposite to that carrying the index gear O is fixed a gear X which drives the gears Y and Z, between which latter gears is mounted a clutch Z⁰ which is keyed to the shaft Z¹ to which is also fastened a gear Z² to mesh with a gear Z³. This latter gear rotates idly upon the feed screw shaft B' when the machine is not feeding, but when the feed is thrown in, a clutch Z⁴ is connected to gear Z³ which causes the feed screw to rotate, thereby feeding the cutter or hob-slide toward or away from the work, which direction depends on whether the clutch Z⁰ is engaged with the gear Y or the gear Z. It is apparent, therefore that the feed will depend upon the revolution of the work-spindle rather than on the revolution of the hob-spindle.

When it is desired to cut spiral gears, the gear G is replaced in position upon the differential worm-shaft H and secured thereto as shown in Fig. 3. When said gear G is placed in position upon said shaft H, it moves the sleeve upon which the movable clutch member H' is formed to the left in Fig. 3, so that said movable clutch member is disengaged from the fixed clutch member G' and the shaft H is then free to turn when the hob slide A' is moved. It will thus be seen that when the shaft H is rotated, the worm I will rotate the worm gear J, which in turn will rotate the differential gear M through the differential pinions L. This rotation of the differential gear M causes all of the mechanism between it and the work spindle to operate to produce the desired lead or rotation of the gear blank. It will likewise be seen that the speed at which the work rotates in relation to the movement of the cutter or hob slide is determined by the gears F and G and that said movements can be varied with relation to each other by changing the size and ratios of said gears.

With the above construction it will be seen that by making the spider in the differential the driver the index driving shaft will be driven twice as fast as the cutter driving shaft, or in other words that one revolution of the cutter driving shaft will result in two revolutions of the index driving shaft.

It will further be seen that by reason of the novel construction and arrangement of clutch members in the lead gear train I am enabled to make use of the differential gearing in the cutting of spur gears as well as spiral gears, and that this will likewise result in maintaining a two to one relationship between the cutter driving shaft and the index driving shaft at all times, including the time when either spur gears or spiral gears are being cut.

It will be understood that I do not wish to limit myself to the exact construction and arrangement of parts hereinbefore described as various changes may be made without departing from the spirit and scope of the invention as set forth in the claims.

What I claim as my invention and desire to secure by Letters Patent is;

1. A machine of the character described having in combination a main driving shaft, a cutter driving shaft, a work spindle, a train of index gears, and a speed multiplying set of differential gears interposed between said cutter driving shaft and the work spindle to coöperate with said train and speed up said spindle during the indexing operation.

2. A machine of the character described having in combination a main driving shaft, a cutter driving shaft, a train of index gears including a set of speed increasing differential gears, the latter having a spider mounted on said cutter driving shaft through which said differential gears are driven.

3. A machine of the character described having in combination a main driving shaft, a cutter driving shaft, an index driving shaft, and a set of differential gears located between said cutter driving shaft and said index driving shaft and driven by said cutter driving shaft, said differential being arranged and adapted to produce an increase in speed in said driving shaft over the speed of said cutter driving shaft.

4. A machine of the class described having in combination a main driving shaft, a cutter driving shaft, an index train of gears, a set of differential gears interposed between said cutter driving shaft and said train, said differential including a pair of main gears, a spider carried by said cutter driving shaft on which is operatively mounted a motion transmitting pinion connecting said main gears through which the speed of said train is increased over that of its said driving shaft.

5. A machine of the character described having in combination a main driving shaft, a cutter driving shaft having a spider secured thereto, a pinion loosely mounted on said spider, a differential gear loosely mounted upon the cutter driving shaft and an index driving shaft having a differential gear secured thereon arranged and adapted to be engaged and driven by said pinion.

6. A machine of the character described having in combination a main driving shaft, a cutter driving shaft arranged at right angles to said main shaft and having a gear connection therewith, a spider secured to the free end of said cutter driving shaft, a differential pinion loosely mounted upon each end of said spider, a differential gear loosely mounted upon the cutter driving shaft, and an index driving shaft having a differential gear secured thereon, both of said differential gears being arranged and adapted to be driven by said differential pinion.

7. A machine of the character described having in combination a main driving shaft, a cutter driving shaft, a cutter slide, a lead gear train from said cutter slide, an index train of gears, a set of differential gears connecting said index train and said cutter driving shaft, and means for connecting and disconnecting said lead gear train and said differential gears.

8. A machine of the character described having in combination a main driving shaft, a cutter driving shaft, a cutter slide, a lead gear train from said cutter slide including a worm, an index train of gears, a set of differential gears connecting said index train and said cutter driving shaft and including a differential worm gear in operative relation with said worm, and means for locking said worm and worm-gear against revolution.

9. A machine of the character described having in combination a main driving shaft, a cutter driving shaft, a cutter slide, a lead gear train from said cutter slide including a set of change gears and a differential worm-shaft having a worm secured thereon, a train of index gears, and a set of differential gears connecting said index train and said cutter driving shaft and including a differential worm gear in operative relation with said worm.

10. A machine of the character described having in combination a main driving shaft, a cutter driving shaft, a cutter slide, a lead gear train from said cutter slide including a set of change gears, a differential worm shaft having a worm secured thereon and a movable clutch member slidably mounted thereon, a bearing for said worm shaft having a stationary clutch member formed thereon, and means for holding said clutch members out of engagement.

11. A machine of the character described having in combination a main driving shaft, a cutter driving shaft, a cutter slide, a lead gear train from said cutter slide including a set of change gears, a differential worm shaft having a worm secured thereon and a movable clutch member slidably mounted thereon, a bearing for said worm shaft having a stationary clutch member formed thereon, means for normally holding said clutch members out of engagement, and means for automatically moving said clutch members into engagement.

12. A machine of the character described having in combination a main driving shaft, a cutter driving shaft, a cutter slide, a lead gear train from said cutter slide, a differential worm shaft having a worm secured thereon and a movable clutch member slidably mounted thereon, a set of change gears located in said lead gear train, one of said change gears being removably mounted upon said differential worm shaft, and a bearing for said worm shaft having a stationary clutch member formed thereon, said clutch members being arranged to be held out of engagement when the change gear is in position upon the differential worm shaft and to be automatically moved into engagement with each other when said change gear is removed from said worm shaft.

13. A machine of the character described having in combination a main driving shaft, a cutter driving shaft, a cutter slide, a lead gear train from said cutter slide, a differential worm shaft having a worm secured thereon and a sleeve slidably mounted thereon, a movable clutch member formed upon one end of said sleeve, a floating bearing for said worm shaft having a stationary clutch member formed thereon, a set of change gears one of which is arranged to be removably secured upon said differential worm shaft and adapted to engage projections upon the outer end of said slidable sleeve and hold said clutch members out of engagement with each other, and a spring member upon said differential worm shaft arranged and adapted to automatically move said movable clutch member into engagement with said stationary clutch member when said change gear is removed from said differential worm shaft.

14. A machine of the character described having in combination a main driving shaft, a cutter driving shaft, a cutter slide, an index train of gears, a set of differential gears connecting said index train and said cutter driving shaft, a lead gear train from said cutter slide normally in operative relation with said differential gears, and means for locking said differential gears by disconnecting said lead gear train from said differential gears.

15. A machine of the character described having in combination a main driving shaft, a cutter driving shaft, a cutter slide, an index train of gears, a set of differential gears connecting said index train and said cutter driving shaft, a lead gear train from said cutter slide normally connected with said differential gears and means for disconnecting said lead gear train from said differential gears without disconnecting said differential gears from said index train and said cutter driving shaft.

BENJAMIN F. WATERMAN.

Witnesses:
J. H. THURSTON,
E. E. TANNER.